UNITED STATES PATENT OFFICE.

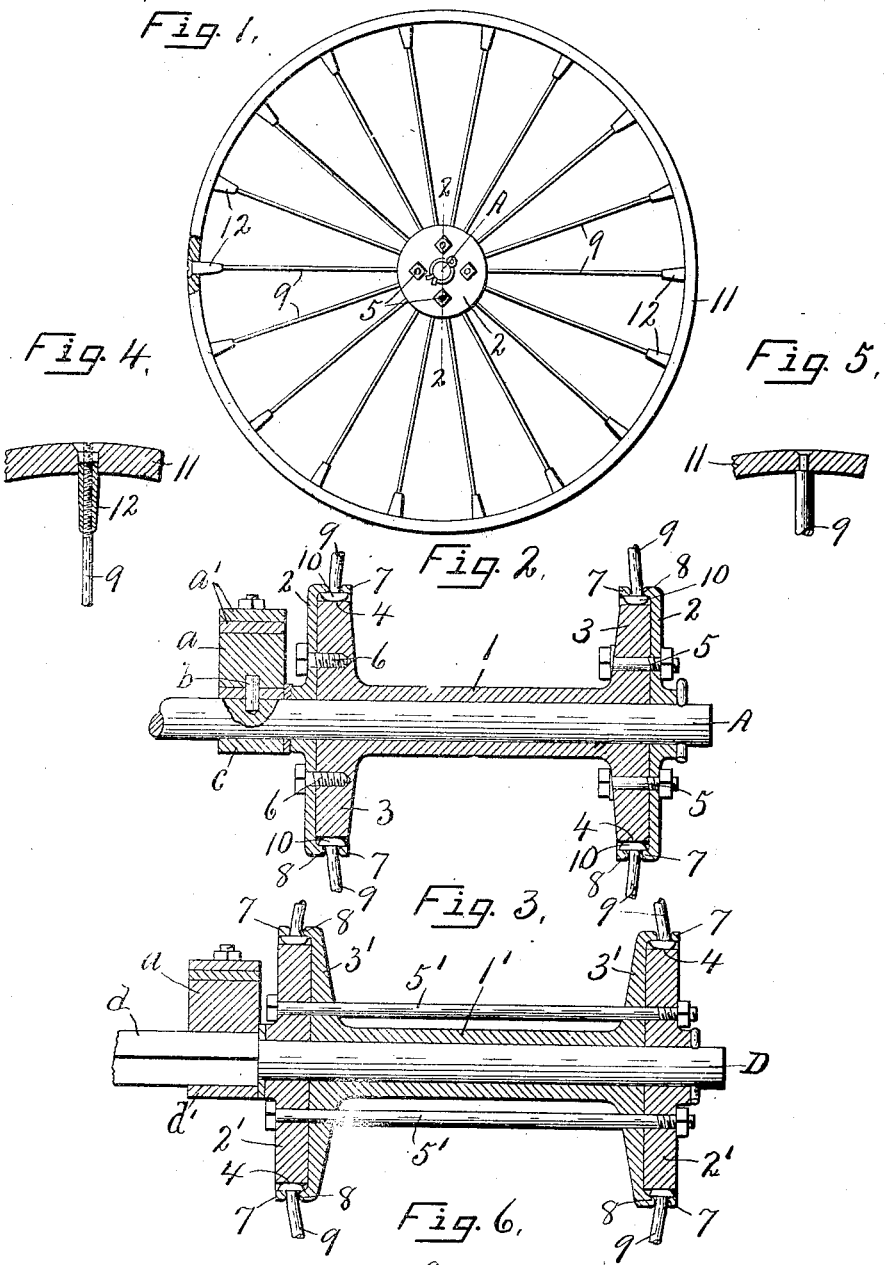

JOSEPH T. KOEN, OF ONEIDA, NEW YORK.

VEHICLE-WHEEL.

1,042,689.  Specification of Letters Patent.  Patented Oct. 29, 1912.

Application filed December 2, 1910. Serial No. 595,215.

*To all whom it may concern:*

Be it known that I, JOSEPH T. KOEN, of Oneida, in the county of Madison, in the State of New York, have invented new and useful Improvements in Vehicle-Wheels, of which the following, taken in connection with the accompanying drawings, is a full, clear, and exact description.

This invention relates to certain improvements in vehicle wheels and although it is particularly adapted for push-carts, it is equally useful in connection with other vehicles in which wheels with wire spokes are desirable. In this class of wheels, the inner ends of the spokes are usually offset or bent laterally and engaged in apertures in radially projecting flanges on the hub and therefore requires that the spokes be made of easily bendable wire which is susceptible to stretching and other deformations under the strains to which they are subjected, thereby limiting the use of this class of wheels to comparatively light vehicles. Furthermore in assembling the wire spokes, in a wheel, where they are passed through radial flanges on the hub, it is necessary to bend or spring the spokes more or less after being attached to the hub in order to properly seat the outer ends in the rim or threaded nipples by which they are attached to the rim and this also limits the size of the wire to that which is easily bendable and capable of being sprung by hand.

The main object therefore of my present invention is to permit the use of wire spokes or round rods of any size so that this class of wheel may be made practicable for heavy as well as light vehicles or loads. In other words recognizing the strength, durability, lightness and economy of manufacture of this type of wheel, I have sought to make practicable its production in any size and for any purpose either as a vehicle wheel or pulley.

A further object is to enable the spokes to be assembled in the hub and rim without necessity for bending or springing the same and a still further object is to provide means for retaining the spokes against radial inward thrust both during the fastening of their outer ends to the rim and also when the wheel is in use.

Other objects and uses will be brought out in the following description.

In the drawings: Figure 1 is a side elevation of a vehicle wheel embodying the various features of my invention, a portion of the rim being shown in section. Fig. 2 is an enlarged lengthwise sectional view through the hub taken on line 2—2, Fig. 1. Fig. 3 is a similar sectional view except that the flanges on the end of the hub are turned outwardly instead of inwardly. Fig. 4 is an enlarged sectional view of a portion of the rim and one of the attaching nipples for securing one of the spokes thereto. Fig. 5 is a similar sectional view of a portion of the rim and adjacent end of one of the spokes riveted thereto. Fig. 6 is an end view of one of the spring seats, partly in section, showing also a transverse section of the shaft and key for locking the shaft to the spring seat.

In illustrating the operation of my invention I have shown a portion of one side of a wagon or push-cart comprising an axle —A— upon which is mounted one or more spring seats —a— for receiving and supporting a spring —a'—, each spring seat being locked to the axle by a suitable key or pin —b— which is fitted in radial recesses in the contiguous sides of the axle and seat, the axle being additionally held in place by a metal strap or bearing —c— and clamping bolts —c'— as shown in Figs. 2 and 6, or, in some instances, I may employ an axle —D— having an angular portion —d— seated in a corresponding angular bearing —d'— on the underside of the spring seat —a— as shown in Fig. —3—, the object in both instances being to lock the axle against rotation relatively to the frame of the vehicle.

The vehicle wheel forming the subject matter of my present invention comprises a hub having horizontally disposed annular flanges spaced some distance apart axially and provided with radial spoke openings for receiving the inner ends of round iron rods or wire spokes, said hub being also provided with annular bearings within their corresponding flanges to form abutments for and to prevent inward end thrust of said spokes, the outer ends of the spokes being secured to a suitable rim.

In Figs. 1 and 2 I have shown a hub as composed of a tubular section —1— of cast metal or other suitable material and opposite end clamps —2— which may also be made of cast or sheet metal, the tubular section —1— being provided with enlarged integral annular end heads —3— having annular peripheral bearings —4— forming seats for the inner ends of the spokes presently described. The end clamps —2— are made separate from the tubular section —1— and preferably consist of cup-shaped disks secured to the outer end faces of their respective heads —3— by bolts —5— or screws —6— and are provided with laterally projecting (preferably inturned) flanges —7— having a circular row of radial apertures —8— spaced uniform distances apart for receiving the inner ends of suitable round iron or wire spokes —9—. These flanges —7— are concentric with and surround the peripheries —4— of their respective heads —3— and are spaced apart a sufficient distance therefrom to receive the heads as —10— on the inner ends of the spokes, the peripheries of the heads —3— serving as abutments for the heads —10— to hold the spokes against inward end thrust when assembled on the hub. The object in making the end clamps —2— separate from and detachably securing them to the heads 3 is to permit the spokes to be readily passed from the inside of the end clamps up through the apertures in the flanges —7— before the clamps —2— are secured to the heads 3 on the main body —1— after which the spokes may be secured to the rim without bending or springing and the sections —2— may then be clamped to the end heads —3— in the manner described, thereby holding the spokes in substantially radial lines ready for attachment to a rim or felly —11—. These attachments may be made either through the medium of threaded nipples —12— as shown in Fig. —4— or by riveting the outer ends of the spokes directly to the rim as shown in Fig. —5—.

In Fig. 3, the heads of the hub are detachable and indicated by the reference character 2' and the end clamps are indicated by the reference character 3' and are integral with the main body 1' of the hub. The heads 2' are secured to the end clamps 3' by suitable fastening means as bolts —5'—, the latter being continuous and extended through suitable apertures in the end clamps 3' and heads 2' parallel with the axis of the hub although it is evident that the heads —2'— and clamps —3'— may be secured together in a manner similar to that shown in Fig. —2— or the bolts shown in Fig. —3— may be used to clamp the sections —1— and —2— together.

As previously stated in assembling the parts of the wheel shown in Fig. —3—, the spokes are first passed radially from the inside of the flanges —7— through the apertures —8— and their outer ends are then secured to the rim in the manner described before the sections —2'— are clamped to the main body —1'—, thus permitting the spokes to be moved inwardly and radially in the operation of inserting their outer ends into the nipples —12— or rim —11—. In this manner I am enabled to use straight spokes of light, medium or extra heavy wire or iron without bending or springing the spokes, it being understood that the operation of attaching the spokes of the flanges —7— to the rim is effected before the sections of the hub are secured together so as to permit such spokes to be moved radially the required distance to enter the rim without bending or springing them. In Fig. 1 a staggered arrangement of spokes is employed while in Figs. 2 and 3, a double and opposite arrangement of spokes is found. When the spokes are thus attached, the sections of the hub are secured together bringing the circular bearings —4— against the inner ends or heads of the spokes to hold the latter against the inner faces of their respective flanges and permitting a final adjustment of the rim or the outer ends of the spokes in truing up the wheel.

What I claim is:

A vehicle wheel comprising a hub including a body, a pair of integral terminal annular heads of greater diameter than the body and each having its periphery constituting a bearing surface, oppositely arranged end clamps of greater diameter than the heads and provided with annular flanges projecting toward each other and spaced from said bearing surfaces, said flanges having perforations therethrough, spokes extending through said perforations and having their inner headed ends engaging with said bearing surfaces, a rim secured to the outer ends of the spokes, and means for connecting the clamps and heads together.

In witness whereof I have hereunto set my hand on this twentieth day of November 1910.

JOSEPH T. KOEN.

Witnesses:
FRANK B. HERMAN,
JOSEPH BEAL.